(12) United States Patent
Varga et al.

(10) Patent No.: US 8,947,743 B2
(45) Date of Patent: Feb. 3, 2015

(54) PARALLEL RIP PROCESSING FOR SHEET IMAGES THAT INCLUDE GRAPHICS DEFINED BY A JOB TICKET

(75) Inventors: John T. Varga, Longmont, CO (US); Rose E. Visoski, Louisville, CO (US); David Ward, Broomfield, CO (US); Robert Keeble, Edgewater, CO (US)

(73) Assignee: Ricoh Company, Ltd., Tokyo (JP)

( * ) Notice: Subject to any disclaimer, the term of this patent is extended or adjusted under 35 U.S.C. 154(b) by 328 days.

(21) Appl. No.: 13/176,050

(22) Filed: Jul. 5, 2011

(65) Prior Publication Data

US 2013/0010325 A1 Jan. 10, 2013

(51) Int. Cl.
*G06K 15/02* (2006.01)
(52) U.S. Cl.
CPC ........ *G06K 15/1857* (2013.01); *G06K 15/1852* (2013.01)
USPC .......................... 358/3.28; 358/1.18; 358/1.15
(58) Field of Classification Search
None
See application file for complete search history.

(56) References Cited

U.S. PATENT DOCUMENTS

| | | | |
|---|---|---|---|
| 7,889,386 B2 * | 2/2011 | Murakami | 358/1.9 |
| 8,339,672 B2 * | 12/2012 | Nguyen et al. | 358/2.1 |
| 2004/0196498 A1 * | 10/2004 | Klassen | 358/1.15 |
| 2006/0139679 A1 * | 6/2006 | Barry et al. | 358/1.13 |
| 2008/0007754 A1 * | 1/2008 | Torii | 358/1.12 |
| 2009/0021762 A1 * | 1/2009 | Saito | 358/1.13 |
| 2009/0051954 A1 * | 2/2009 | Miyata | 358/1.13 |
| 2010/0110467 A1 * | 5/2010 | Coniglio et al. | 358/1.13 |

FOREIGN PATENT DOCUMENTS

WO    0013079 A    3/2000

* cited by examiner

*Primary Examiner* — Fred Guillermety
*Assistant Examiner* — Keara Harris
(74) *Attorney, Agent, or Firm* — Duft Bornsen & Fettig LLP

(57) ABSTRACT

Systems and methods are provided for processing a logical page in parallel with graphics for the sheet that are defined in a job ticket. The system includes multiple parallel Raster Image Processors (RIPs) and a control system. The control system receives print data and a job ticket, identifies a graphic that is associated with a logical page and defined in the job ticket, and transmits the logical page to a parallel RIP for processing. The parallel RIP determines page dimensions from the logical page, transmits the page dimensions, and rasterizes the logical page. The control system determines a location for the graphic based upon the transmitted page dimensions, and directs another RIP to rasterize the graphic in order to generate a rasterized graphic in parallel with the RIP that is rasterizing the logical page.

20 Claims, 5 Drawing Sheets

PARALLEL RIP PROCESSING FOR SHEET IMAGES THAT INCLUDE GRAPHICS DEFINED BY A JOB TICKET

FIELD OF THE INVENTION

The invention relates to the field of printing systems, and in particular, to parallel processing of pages in a print job.

BACKGROUND

In the field of printing, it is generally desirable to maximize printing quality and printing speed at a printer. Customers tend to dislike any delay that occurs between sending a print job to a printer, and receiving the printed sheets of the print job. Therefore, printer manufacturers strive to optimize the physical printing speed of marking engines that mark printed sheets and the processing speed of devices that prepare incoming print jobs for printing by interpreting and rasterizing them.

In order to increase the processing speed for incoming print data, print controllers often include multiple Raster Image Processors (RIPs) that operate in parallel. The print controller splits the incoming print job into segments of data (e.g., logical pages), and sends the logical pages to the parallel RIPs for interpretation and rasterization. For example, each of the parallel RIPs may interpret incoming logical pages by generating a display list or other instructions for marking pels on a sheet. The parallel RIPs may further rasterize/render the logical pages into a sheetside image ("sheet image") by placing pels in a bitmap with an appropriate mark/color based upon the generated display list.

Processing incoming print data using parallel RIPs is generally desirable because it increases the speed at which a print job may be interpreted and rasterized, which is often the most time consuming part of printing an incoming job. However, using multiple RIPs in parallel to generate a single sheetside image for a logical page remains a complicated process. Often, an incoming logical page exists in the form of print data according to a page description language (e.g., PostScript). This logical page may also be associated with a job ticket (e.g., a JDF job ticket), and the job ticket may indicate further graphical elements to place on the sheetside image for the logical page. These additional graphics, known as "relative page elements," may include watermarks, headers, footers, and other graphics comprising text and/or symbols. Because these additional graphics are not part of the print data of the logical page itself, they do not accompany information that indicates the actual size and orientation of the page that they are intended for (i.e., the physical sheet upon which the graphics will be presented to a user). Instead, these graphics often use generic instructions indicating a relative location on a page. Examples could include "top," "bottom," "header," "footer," "centered," "left," "right," and others. The exact location at which to rasterize these graphics within the sheetside image is therefore not determined until the logical page has already been interpreted and is being processed by a RIP. Because the location of these graphics cannot be determined until the logical page is already being interpreted by a single RIP, it remains a problem to process these graphics in parallel with the print data for the logical page in order to generate a sheetside image for the page.

SUMMARY

Embodiments described herein disclose parallel Raster Image Processors (RIPs) that are capable of processing print data for a logical page and reporting the dimensions of the page to a control system. With this information in hand, the control system determines a location for graphics residing in a job ticket that are associated with the logical page. The control system then instructs the RIPs to initiate processing of the logical page and the graphics in the job ticket substantially concurrently, thereby generating a single sheetside image using parallel processing. This allows a sheetside image for the page to be built much more quickly than serial processes currently allow. This sheetside image may then be transmitted for use by a display or marking engine.

One embodiment is a print controller that includes multiple parallel Raster Image Processors (RIPs) and a control system. The control system is able to receive print data and a job ticket, and the print data includes a plurality of logical pages. The control system is further able to identify a graphic that is associated with a logical page and defined in the job ticket, and to transmit the logical page to a parallel RIP for processing. The parallel RIP is able to receive the logical page, to determine page dimensions from the logical page, to transmit the page dimensions, and to rasterize the logical page. The control system is further able to determine a location for the graphic based upon the transmitted page dimensions, and to direct another RIP to rasterize the graphic in order to generate a sheet image in parallel with the RIP that is interpreting the logical page.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
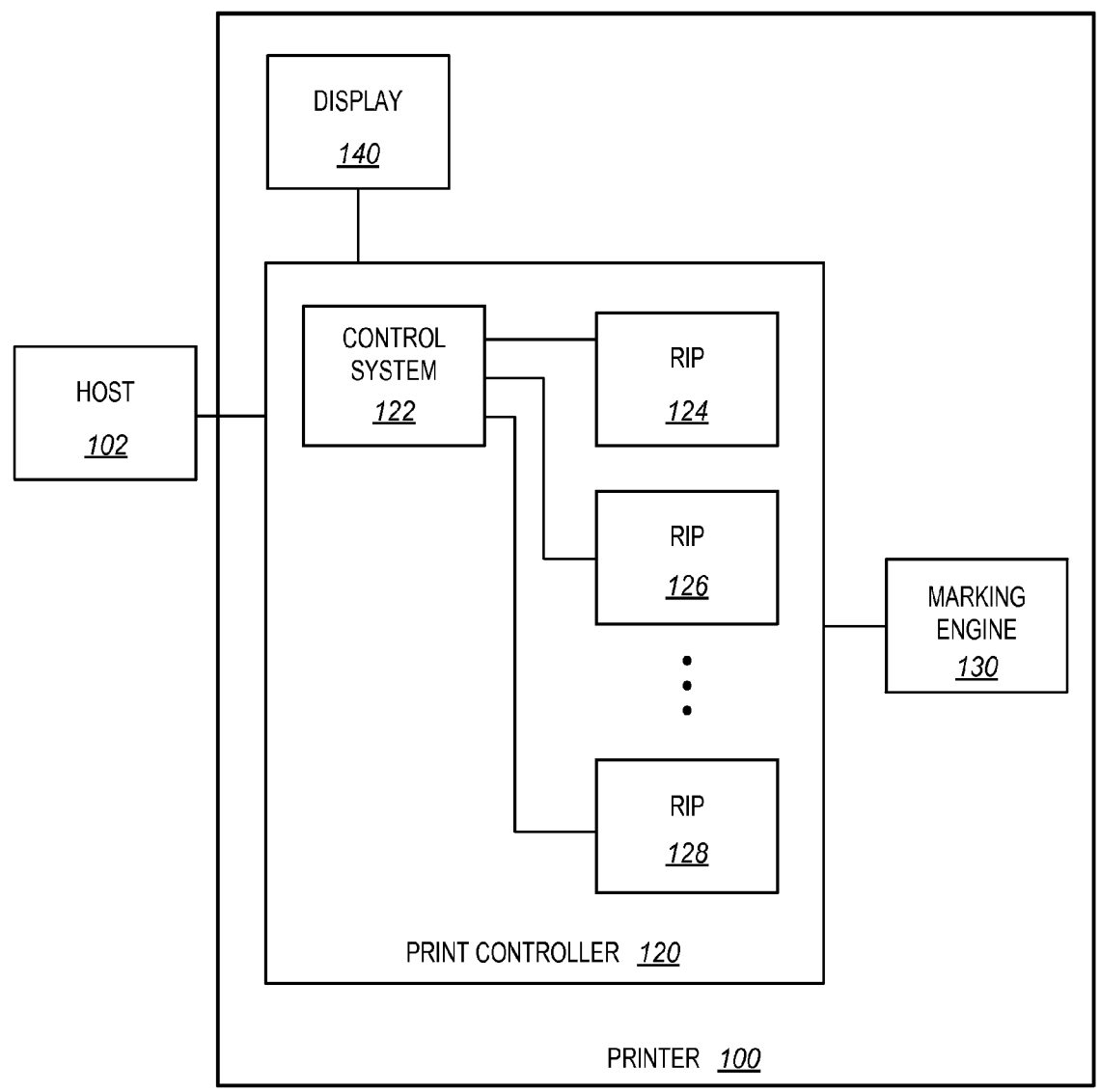
FIG. 1 is a block diagram of a print controller in an exemplary embodiment.

FIG. 1 is a block diagram of a print controller 120 in an exemplary embodiment. In FIG. 1, print controller 120 is coupled with host 102, marking engine 130, and display 140. Host 102 may comprise a computer, a print server, a software application, or any other functional component capable of submitting a print job comprising print data and a job ticket. Print controller 120 is implemented at printer 100, and comprises any system, device, or component operable to control operations at printer 100. In this embodiment, print controller 120 comprises a control system 122 in communication with Raster Image Processors (RIPs) 124-128. Control system 122 comprises any system, component, or device operable to direct Raster Image Processors (RIPs) in the interpretation and rasterization of the print job. RIPs 124-128 may comprise any combination of multiple RIPs used for image processing. For example, RIPs 124-128 may comprise two, three, or even more RIPs designed for parallel processing. Furthermore, each RIP 124-128 may have the same processing speed as other RIPs, or may have a faster or slower processing speed than other RIPs of print controller 120. RIPs 124-128 may be implemented on single-core or multi-core processors.

Print controller 120 receives incoming print jobs from host 102, and transmits rasterized data for the print job to marking engine 130 or display 140. Marking engine 130 may comprise any combination of printing machinery operable to mark sheetside images onto a sheet of paper (or other marking media). Marking engine 130 may use toner or ink to mark an image onto a sheet. Display 140 may comprise any combination of systems or devices for displaying sheetside images from print controller 120 to a user. Display 140 may include, for example, a monitor, television, screen, mobile device, or other system. In this embodiment, display 140 is implemented at printer 100, although display 140 may also be implemented at host 102 or other devices communicably coupled with printer 100.

Print controller 120 provides a benefit over existing systems because it utilizes one of RIPs 124-128 to process an incoming logical page and determine the size and orientation of the page (i.e., the physical sheet) upon which the logical page will be printed. This RIP then reports the physical properties of the page to control system 122. With knowledge of the dimensions of the page and the orientation, control system 122 determines coordinates at which to place graphic elements from the job ticket onto the sheetside image for the page. Control system 122 further forwards these graphics for parallel processing by other RIPs of print controller 120. The rasterization of the graphic elements may occur in tandem with the rasterization of the logical page itself by the first RIP, thereby allowing single sheetside images to be processed in parallel.

Further details of the operation of print controller 120 will be discussed with regard to FIG. 2. Assume, for this embodiment, that print controller 120 is capable of initiating parallel processing of logical pages of incoming print jobs. Further assume that print controller 120 is capable of processing graphics defined in a job ticket in parallel with the print data of the logical page itself.

Figure 2:
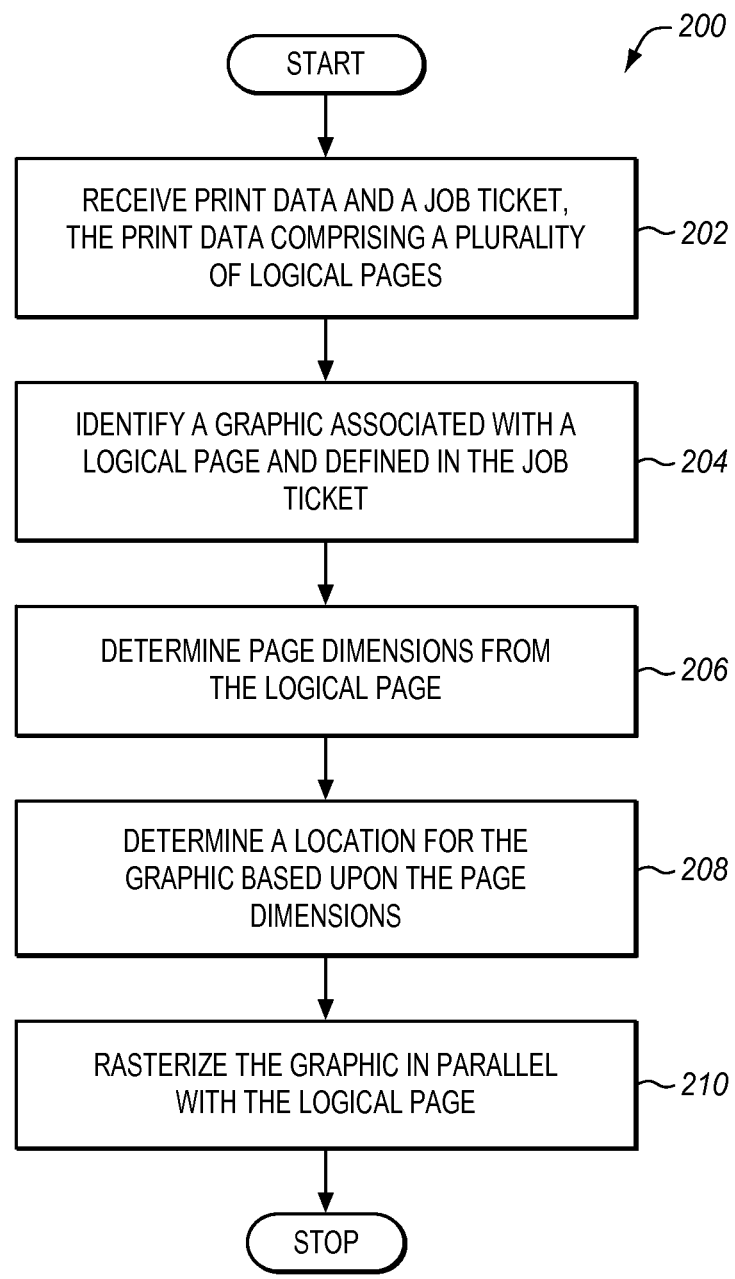
FIG. 2 is a flowchart illustrating a method for processing elements of a sheet image in parallel in an exemplary embodiment.

FIG. 2 is a flowchart illustrating a method 200 for processing elements of a sheet image in parallel in an exemplary embodiment. The steps of method 200 are described with reference to print controller 120 of FIG. 1, but those skilled in the art will appreciate that method 200 may be performed in other systems or devices. The steps of the flowcharts described herein are not all inclusive and may include other steps not shown. The steps described herein may also be performed in an alternative order.

In step 202, control system 122 receives print data and a job ticket, the print data comprising a plurality of logical pages. The print data may be encoded according to a page description language (e.g., PostScript). The logical pages of the print job may be segmented into individual logical pages at the time the print data is received, or control system 122 may segment the incoming print data into logical pages after receiving the print data. Control system 122 distributes the logical pages to parallel RIPs 124-128 for interpretation and rasterization. When a logical page is associated with graphics defined in the job ticket, the following steps are performed in order to use parallel processing to generate a sheetside image for the page.

In step 204, control system 122 identifies a graphic associated with a logical page and defined in the job ticket. The graphic content is intended to be added to one or more pages of the print job during the generation of a sheetside image for the page, resulting in a single sheetside image that includes both the rasterized print data of the logical page, and the rasterized graphic from the job ticket. The graphic may be a predefined symbol, image, text, Encapsulated PostScript object, or some combination thereof. In one embodiment, the graphic may be generated based on instructions in the job ticket.

The graphic may be associated with a logical page or a set of logical pages in the print data by referencing a name for the logical page(s), a number or set of numbers, a tag, etc. Accompanying the graphic in the job ticket are placement criteria for the graphic. Typically, the placement criteria will indicate a relative location on the page upon which to place the graphic. Examples of such locations include a header, a footer, the center of the page, the left portion of the page, the right portion of the page, corners of the page, and others. Without further details apart from the relative placement criteria in the job ticket, the exact position of these graphics on the page is unknown. Thus, it is desirable to determine the dimensions for the page so that the graphics defined in the job ticket can be added to a sheetside image for the page and processed in parallel with the print data of the logical page.

Once it has been determined that the sheetside image for the logical page will include both print data from the logical page and a graphic defined in the job ticket, control system 122 determines that the sheetside image for the logical page is a candidate for parallel processing. Control system 122 transmits the logical page to RIP 124 for processing. In addition to transmitting the logical page itself, control system 122 may transmit an instruction for RIP 124 to report back the dimensions of the page.

During processing of the print data of the logical page, RIP 124 determines the dimensions of the page, as in step 206. This determination will typically take place when RIP 124 interprets the logical page. Interpretation is distinguished from rasterization in that interpretation occurs when a RIP reads the print data and creates a display list or other series of commands for defining an output image. In contrast, rasterization (also known as "rendering" or "screening") is the task of taking an image described in, for example, a vector graphics format (e.g., a display list) and generating a raster image (e.g., pixels or dots placed at specific locations) for output on a marking engine. The rasterized image ("dots on a sheet") may be assembled with other rasterized images to create the sheetside image that is marked upon physical sheets by marking engine 130. Interpretation is generally a much faster process than rasterization. For example, depending on the complexity of the print data in a segment, interpretation may be about three times as fast as rasterizing.

The page dimensions/geometry determined by RIP 124 may comprise, for example, a width and a height for the page upon which the data will be printed, or may comprise a standardized size for a sheet (e.g., A4) accompanied by an orientation/rotation (e.g., landscape). RIP 124 transmits the determined page dimensions (e.g., page size and orientation) to control system 122.

Control system 122 receives the information on page dimensions transmitted by RIP 124, and determines a location for the graphic, based upon the page dimensions and the placement criteria in step 208. The location may be a coordinate or set of coordinates that align the graphic within the sheetside image. The location may be determined based upon a predefined list of coordinates that corresponds to known standard sizes and orientations of pages. For example, placement criteria indicating that the graphic should be 'centered' may correspond to a known list of coordinates that have been pre-calculated for letter, legal, A4, and other sizes of paper. Alternatively, knowledge of the page size may allow for the placement criteria to be determined based upon a formula. For example, a 'centered' location may always be located at a vertical location equal to half of the sheet's height, and a horizontal location equal to half of the sheet's width. During the placement of these graphics, it may also be desirable to determine the printable margins of the page at marking engine 130, and to ensure that the graphic does not cross these margins.

In step 210, control system 122 directs RIP 126 to rasterize the graphic at substantially the same time (i.e., in parallel) as RIP 124 rasterizes the logical page. If multiple graphics are included in the job ticket for the logical page, each may be sent to RIP 126, or each may be sent to a different RIP for processing in parallel with the logical page itself. This in turn reduces the amount of time spent rasterizing a single sheet of the print job. Upon completion of the parallel process, the rasterized logical page and the rasterized graphic(s) may be assembled into a single sheetside image for use by marking engine 130 or display 140. This assembly of the sheetside image may be performed, for example, by a dedicated sheetside assembler of print controller 120.

Using the method described above, a print job may be beneficially processed in parallel, and furthermore, each page of the print job may be processed in parallel. Thus, pages of the print job may be processed at a faster speed than normal serial processes allow.

Examples

In the following examples, additional processes, systems, and methods are described in the context of a print controller that generates a sheetside image utilizing parallel processing in an exemplary embodiment.

Figure 3:
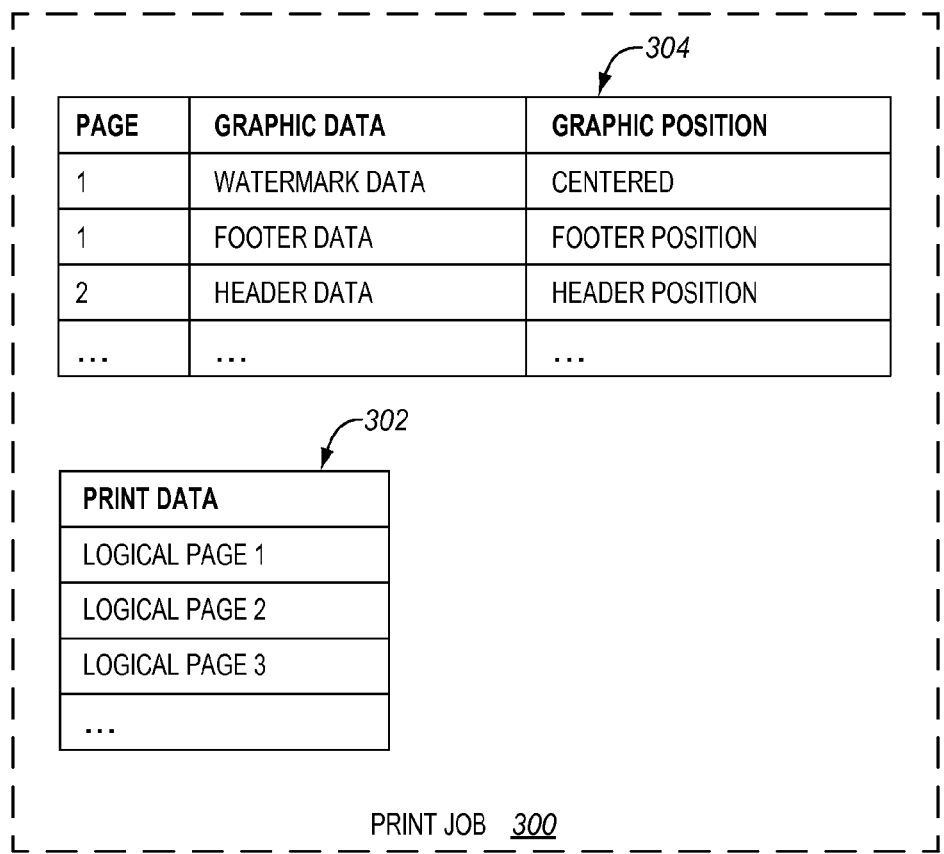
FIG. 3 illustrates a print job in an exemplary embodiment.

FIG. 3 illustrates a print job 300 in an exemplary embodiment. According to FIG. 3, print job 300 includes print data 302 that comprises a plurality of logical pages, each logical page encoded according to a page description language. Print job 300 is illustrated with dashed lines to indicate that print job 300 exists as data and not as a physical device or component of print controller 120. Print job 300 further comprises a job ticket 304. Job ticket 304 is encoded according to the Job Definition Format (JDF) standard, and defines graphics for use with the print job, a page number associated with each graphic, and a relative page position at which to place each graphic. In this example, the first logical page of print data 302 is associated with two graphics in job ticket 304: a watermark and a footer.

Assume, for this example, that print controller 120 of FIG. 1 receives print job 300 and initiates processing of the first logical page of print data 302. Control system 122 determines that job ticket 304 has defined two graphics to place on the sheetside image for the page. At this stage, the logical page has yet to be interpreted or rasterized. As such, the page dimensions remain unknown to control system 122.

Figure 4:
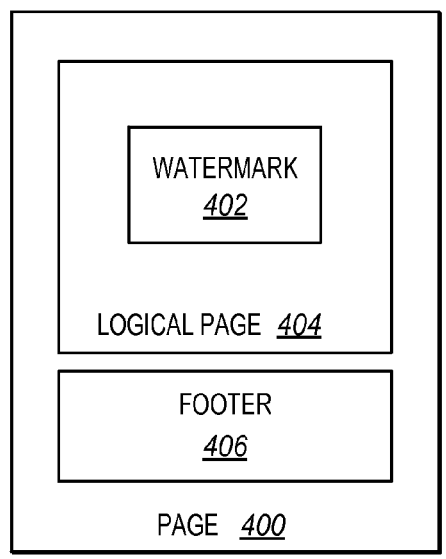
FIG. 4 illustrates a logical page and graphics from a job ticket in an exemplary embodiment.

FIG. 4 illustrates a logical page 404 and graphics from a job ticket in an exemplary embodiment. Assume, for this example, that logical page 404 and its associated graphics are defined in print job 300 of FIG. 3. According to FIG. 4, logical page 404 includes content intended for placement upon a physical page 400 (i.e., a physical sheet of media). Graphics associated with logical page 404 include watermark 402 and footer 406. These graphics are defined in a job ticket for the print job. Watermark 402 occupies the same space on the page as logical page 404, while footer 406 occupies an area of page 400 that does not include print data from logical page 404. Thus, when printed, page 400 will include logical page 404, and will also include watermark 402 and footer 406 defined in the job ticket.

Figure 5:
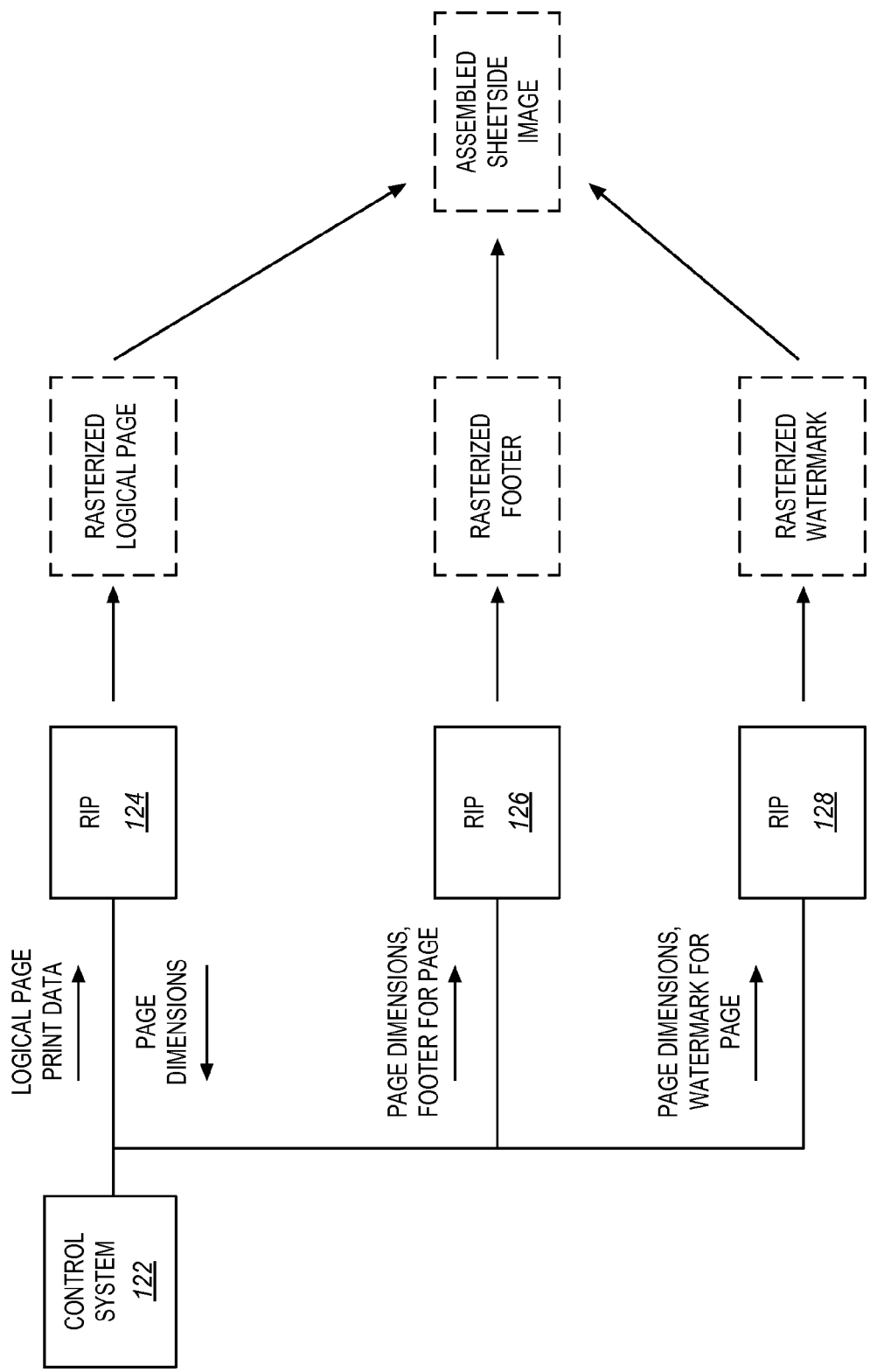
FIG. 5 illustrates communications between a control system and Rasterization Image Processors (RIPs) in an exemplary embodiment.

FIG. 5 illustrates communications between control system 122 and RIPs 124-128 of FIG. 1 in an exemplary embodiment. According to FIG. 5, control system 122 sends a logical page (e.g., logical page 404 of FIG. 4) to RIP 124. RIP 124 initiates the interpretation process, and finds an operator within the page description language for the logical page that defines the height and width of the page in points (612 points wide by 792 points tall). RIP 124 transmits this information about page dimensions to control system 122, and resumes interpretation and rasterization of the logical page.

Control system 122 receives the page dimensions from RIP 124, and determines a center coordinate for a watermark at the page. Control system 122 further determines a coordinate for a footer at the page (e.g., centered, and 50 points above the bottom coordinate of the page). Control system 122 then transmits the footer and the watermark, and their associated positions, to RIPs 126 and 128 for processing. RIPs 124-128 therefore operate in parallel to generate components of a single sheetside image.

When RIP 124 and RIP 126 complete their rasterization of the logical page and the graphics, they report completion of the tasks to control unit 122. Control unit 122 then directs a backend assembler to assemble the rasterized logical page and the rasterized graphics into a single rasterized sheetside image, and control unit 122 transmits the rasterized sheetside image for use by marking engine 130.

Figure 6:
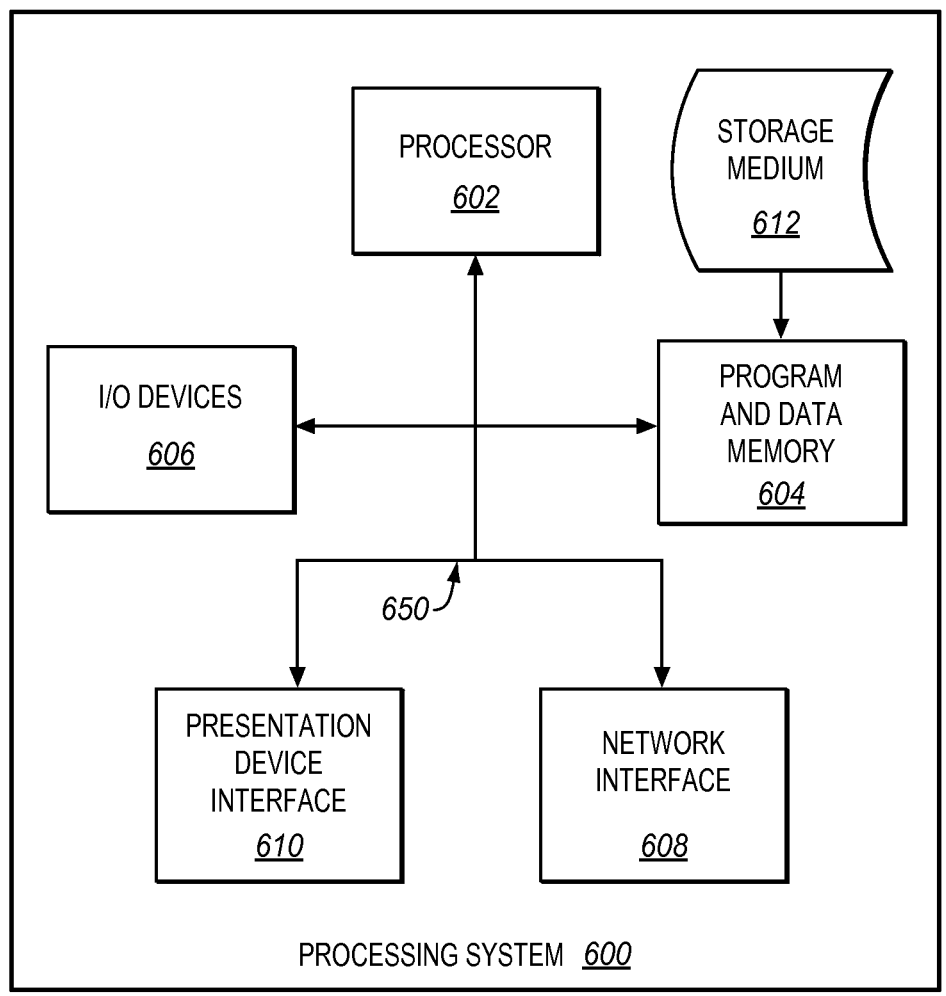
FIG. 6 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of print controller 120 to perform the various operations disclosed herein. FIG. 6 illustrates a processing system operable to execute a computer readable medium embodying programmed instructions to perform desired functions in an exemplary embodiment. Processing system 600 is operable to perform the above operations by executing programmed instructions tangibly embodied on a computer readable storage medium 612. In this regard, embodiments of the invention can take the form of a computer program accessible via the computer-readable medium 612 providing program code for use by a computer or any other instruction execution system. For the purposes of this description, a computer readable storage medium 612 can be anything that can contain or store the program for use by the computer.

The computer readable storage medium 612 can be an electronic, magnetic, optical, electromagnetic, infrared, or semiconductor device. Examples of the computer readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 600, being suitable for storing and/or executing the program code, includes at least one processor 602 coupled to memory elements 604 through a system bus 650. The memory elements 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled to the system either directly or through intervening I/O controllers. Network adapter interfaces 608 may also be coupled to the system to enable the processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 610 may be coupled to the system to interface to one or more presentation devices, such as printing systems and displays for presentation of presentation data generated by processor 602.

Although specific embodiments were described herein, the scope of the invention is not limited to those specific embodiments. The scope of the invention is defined by the following claims and any equivalents thereof.

We claim:

1. A print controller for processing a print job in parallel, comprising:
    multiple parallel Raster Image Processors (RIPs); and
    a control system operable to receive print data and a job ticket, wherein the print data comprises a plurality of logical pages, to identify a graphic that is associated with one of the logical pages and is defined in the job ticket, and to transmit the logical page to a first parallel RIP for processing;
    wherein the first parallel RIP is operable to receive the logical page, to determine page dimensions from the logical page, to transmit the page dimensions to the control system, and to initiate rasterization of the logical page to generate a sheet image, and
    wherein the control system is further operable to determine a location for the graphic on the sheet image based upon the transmitted page dimensions from the first parallel RIP, and to direct a second parallel RIP to rasterize the graphic in parallel with the first parallel RIP rasterizing the logical page, thereby generating the sheet image using parallel processes.

2. The print controller of claim 1, wherein:
the job ticket further comprises a placement criteria for the graphic; and
the control system is further operable to determine a location for the graphic based upon the page dimensions and the placement criteria.

3. The print controller of claim 1, wherein:
the parallel RIP is further operable to determine the page dimensions based upon interpreted print data for the logical page.

4. The print controller of claim 1, further comprising:
a backend assembler operable to combine the rasterized graphic and the rasterized logical page to generate a single sheet image.

5. The print controller of claim 1, wherein:
the page dimensions describe size and orientation; and
the control system is further operable to determine a location for the graphic based upon the size and orientation.

6. The print controller of claim 1, wherein:
the page dimensions include a name indicating a standardized page size.

7. The print controller of claim 1, wherein:
the graphic comprises a watermark.

8. A method for processing a print job in parallel, comprising:
    receiving print data and a job ticket, wherein the print data comprises a plurality of logical pages;
    identifying a graphic that is associated with one of the logical pages and is defined in the job ticket;
    determining, with a first parallel Raster Image Processor (RIP), page dimensions from the logical page;
    determining a location for the graphic on a sheet image based upon the page dimensions determined by the first parallel RIP; and
    rasterizing the logical page at the first parallel RIP in parallel with rasterizing the graphic at the location at a second parallel RIP, thereby generating the sheet image using parallel processes.

9. The method of claim 8, wherein:
the job ticket further comprises a placement criteria for the graphic; and wherein the method further comprises:
determining a location for the graphic based upon the page dimensions and the placement criteria.

10. The method of claim 8, further comprising:
determining the page dimensions based upon interpreted print data for the logical page.

11. The method of claim 8, further comprising:
combining the rasterized graphic and the rasterized logical page to generate a single sheet image.

12. The method of claim 8, wherein:
the page dimensions describe size and orientation; and wherein the method further comprises:
determining a location for the graphic based upon the size and orientation.

13. The method of claim 8, wherein:
the page dimensions include a name indicating a standardized page size.

14. The method of claim 8, wherein:
the graphic comprises a watermark.

15. A method for processing a print job in parallel, comprising:
    receiving print data and a job ticket, wherein the print data comprises a plurality of logical pages;
    identifying a graphic that is associated with one of the logical pages and is defined in the job ticket;
    determining, with a first parallel Raster Image Processor (RIP), page dimensions from the logical page;
    determining a location for the graphic on a sheet image based upon the page dimensions determined by the first parallel RIP; and
    rasterizing the logical page at the first parallel RIP in parallel with rasterizing the graphic at the location at a second parallel RIP, thereby generating the sheet image using parallel processes.

16. The medium of claim 15, wherein:
the job ticket further comprises a placement criteria for the graphic; and wherein the method further comprises:
determining a location for the graphic based upon the page dimensions and the placement criteria.

17. The medium of claim 15, wherein the method further comprises:
determining the page dimensions based upon interpreted print data for the logical page.

18. The medium of claim 15, wherein the method further comprises:
   combining the rasterized graphic and the rasterized logical page to generate a single sheet image.
19. The medium of claim 15, wherein:
   the page dimensions describe size and orientation; and wherein the method further comprises:
   determining a location for the graphic based upon the size and orientation.
20. The medium of claim 15, wherein:
   the page dimensions include a name indicating a standardized page size.

\* \* \* \* \*